(12) United States Patent
Tran et al.

(10) Patent No.: US 6,675,832 B1
(45) Date of Patent: Jan. 13, 2004

(54) BLOWDOWN VALVE

(75) Inventors: Duc Thanh Tran, Corona, CA (US);
Stanley F. Miller, Orange, CA (US);
Stephen G. Freitas, Mission Viejo, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 0 days.

(21) Appl. No.: 10/431,475

(22) Filed: May 7, 2003

(51) Int. Cl.[7] .............................................. F16K 47/04
(52) U.S. Cl. .................. 137/613; 137/625.32; 251/127; 251/368
(58) Field of Search ......................... 137/613, 625.31, 137/625.32; 251/127, 368

(56) References Cited

U.S. PATENT DOCUMENTS

| | | | | |
|---|---|---|---|---|
| 3,681,191 A | * | 8/1972 | Farrelly .................. | 251/315.15 |
| 4,106,562 A | * | 8/1978 | Barnes et al. ............ | 166/75.12 |
| 4,449,544 A | * | 5/1984 | Soderberg .............. | 251/315.09 |
| 4,610,273 A | * | 9/1986 | Bey ....................... | 137/625.32 |
| 5,332,004 A | * | 7/1994 | Gethmann et al. ...... | 137/625.32 |
| 5,509,446 A | * | 4/1996 | Bey ....................... | 137/625.32 |
| 5,524,863 A | * | 6/1996 | Davis ..................... | 251/127 |
| 6,220,290 B1 | * | 4/2001 | Lomax ................... | 137/613 |

\* cited by examiner

*Primary Examiner*—Kevin Lee
(74) *Attorney, Agent, or Firm*—Stetina Brunda Garred & Brucker (57) ABSTRACT

Disclosed is a blowdown valve for a boiler system for removing fluid that contains debris. The blowdown valve comprises a housing for a shutoff valve and a reversible throttle valve. The shutoff valve is fluidly connected to a fluid inlet that, in turn, is connected to the boiler system. Each one of the shutoff and throttle valves includes a rotatable valve ball having a bore formed therethrough. Rotation of the valve ball alternately blocks and unblocks fluid flowing therethrough. The throttle valve bore includes first and second bore ends. A bore insert is disposed within the bore between first and second debris zones. The bore insert includes passages configured for reducing fluid energy. The first and second debris zones entrap debris therewithin. The throttle valve reverses positions of the first and second debris zones such that entrapped debris may be flushed out of the fluid outlet.

19 Claims, 7 Drawing Sheets

BLOWDOWN VALVE

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention pertains generally to fluid control devices and, more particularly, to a flushable blowdown valve adapted for the removal of sediment, pipe scale and other debris that may accumulate in boiler water of a boiler system.

In many applications such as power plants, paper mills and oil and gas refineries, boiler water is typically circulated through a boiler drum and/or boiler evaporator. Fuel such as natural gas, fuel oil or coal is utilized to heat the boiler water in the boiler drum in order to produce steam. The steam is routed to a turbine that rotates a generator for producing electricity. Over time, the boiler water in the boiler drum accumulates non-condensable, dissolved solids. For purposes of this discussion, such non-condensable, dissolved solids are referred to as debris. The debris may include dirt, sediment and piping scale.

If the debris is not removed from the boiler system, the boiler system will cease to function efficiently. A general rule of thumb in boiler system efficiency is that the heat transfer coefficient of the boiler system decreases by 10% for every 1% of debris (non-condensables) that is dissolved in the boiler water. Thus, a power plant may realize significant energy savings by improving the heating efficiency of the boiler system through a reduction in the amount of debris in the boiler water. The increased heating efficiency of the steam generation translates into significant cost savings through reduced fuel consumption.

Although de-mineralized feedwater may be utilized in boiler systems to minimize the accumulation of debris in the boiler drum, periodic blowdown of the boiler drum is still necessary in order to keep the boiler system free of debris and ensures its efficient operation. Periodic blowdown also provides for long and reliable equipment life while reducing maintenance time and expense. Blowdown may be performed manually on a daily basis or it may be performed semi-automatically wherein a timer is utilized to initiate blowdown for short periods according to a pre-set schedule.

The blowdown process involves activating a blowdown valve connected to the boiler drum and drawing off a small percentage of the debris-carrying boiler water from below the surface of the water in the boiler drum. The boiler water draining from the boiler drum may be pressurized up to about 5000 psi and may be heated to a temperature of up to 250° C. Conventional blowdown valves therefore may include an energy reduction device such as a diffuser to reduce the pressure and velocity of the boiler water. The energy of the pressurized and heated boiler water is typically reduced such that the high noise levels resulting from the expansion of boiler water exiting the blowdown valve may be minimized Prior art gate valves are sometimes utilized as blowdown valves. Such prior art gate valves may include a diffuser or cage to reduce the energy of the passing high pressure boiler water. However, these prior art gate valves are configured such that fluid, including boiler water, must make a sharp turn in order to flow upwardly through a valve opening and through the cage. The combination of the pressurized boiler water and the debris carried therein acts to erode the valve body at the location near the valve opening where the flow sharply turns. Furthermore, such gate valves typically include a plug that tends to open relatively slowly such that the high-pressure boiler water will erode the plug and valve seat before the plug opens sufficiently. The erosion of the valve seat compromises closure of the valve such that leakage of the gate valve may occur. The constant leakage of the boiler water through the gate valve further accelerates the erosion damage to the valve seat.

The prior art includes blowdown valves that are configured to eliminate the above-described erosion problems of gate valves. Such blowdown valves combine a shutoff valve with a separate diffuser. The shutoff valve is an on/off valve that essentially protects the diffuser against erosion. More specifically, the shutoff valve protects a valve seat of the diffuser from erosion. In operation, the shutoff valve is initially placed in a closed or shutoff position. The diffuser is then opened and adjusted to allow for passage of a predetermined flow of boiler water.

The shutoff valve is then fully opened, allowing the boiler water to flow through the diffuser with minimal impingement upon the diffuser valve seat. By strictly limiting the shutoff valve to be fully opened or fully closed, the diffuser valve seat is not impinged by the boiler water. However, the boiler water occasionally carries debris that is too large to pass through the diffuser. Such large-sized debris accumulates at the entrance to the diffuser. Over time, the accumulation of debris may block the diffuser such that removal of the blowdown valve is necessary in order to remove the debris. Such periodic maintenance is both time consuming and costly.

The present invention specifically addresses and alleviates the above referenced deficiencies associated with prior art blowdown valves by providing a blowdown valve that combines a shutoff valve with a reversible diffuser or throttle valve. Advantageously, the throttle valve includes a pair of debris collection areas or debris zones located respectively on upstream and downstream ends of the throttle valve. When the accumulation of debris in one of the debris zones reaches a predetermined limit, the throttle valve is configured to be repositioned 180 degrees such that the debris-filled debris zone is placed downstream of the throttle valve where it may be flushed out of the blowdown valve by the flowing boiler water.

SUMMARY OF THE INVENTION

The blowdown valve of the present invention is adapted for the removal of sediment, pipe scale and other debris that may accumulate in boiler water of a boiler system. The blowdown valve is comprised of housing, a shutoff valve and a reversible throttle valve. The housing has a fluid inlet and a fluid outlet. The housing defines a housing axis. The shutoff valve and the throttle valve are disposed adjacent respective ones of the fluid inlet and the fluid outlet. During operation of the blowdown valve, the shutoff valve and the throttle valve are aligned with the housing axis. The fluid inlet and fluid outlet are in axial alignment with each other. The fluid inlet is fluidly connected to the boiler system and is configured for receiving fluid therefrom.

The shutoff valve is also fluidly connected to the fluid inlet and includes a rotatable, generally spherically-shaped valve ball having a shutoff valve bore formed therethrough. The valve ball is configured such that rotation through an angle of about 90 degrees alternately places the shutoff valve bore into and out of alignment with the fluid inlet. The shutoff valve is configured such that when the shutoff valve bore is rotated into alignment with the fluid inlet, the shutoff valve is unblocked such that fluid may pass through the shutoff valve bore. When the shutoff valve bore is rotated 90 degrees out of alignment with the fluid inlet, the passage of fluid through the shutoff valve is blocked.

The throttle valve is fluidly connected to and interposed between the shutoff valve and the fluid outlet. The throttle valve also comprises a rotatable, generally spherically-shaped valve ball having a throttle valve bore formed therethrough. The throttle valve bore includes a first end and a second end. A bore insert is interposed within the throttle valve bore between the first and second ends. The throttle valve bore is axially alignable with the fluid outlet.

The bore insert is configured for reducing energy of fluid flowing therethrough. The energy of the fluid is manifested in an elevated pressure and velocity of the fluid. The bore insert includes a plurality of passages configured to reduce the pressure and velocity of the fluid so as to reduce the noise level that is produced by the fluid as it exits the blowdown valve. The bore insert and the first end of the throttle valve bore collectively define a first debris zone.

Likewise, the bore insert and the second end of the throttle valve bore collectively define a second debris zone. The first debris zone is disposed on one side of the bore insert with the second debris zone being disposed on an opposite side of the bore insert. The first debris zone is configured to entrap debris therewithin when the first debris zone is disposed between the bore insert and the shutoff valve, and vice versa. Debris that is too large to pass through the passages of the bore insert is alternately deposited within the first and second debris zones.

The valve ball is configured such that rotation of the valve handle through an angle of about 180 degrees reverses positions of the first and second debris zones. By reversing positions of the first and second debris zones, entrapped debris may be flushed out of the fluid outlet by fluid flowing through the blowdown valve when the shutoff valve bore is rotated into alignment with the fluid inlet. The blowdown valve of the present invention is configured such that the above-described blowdown operation may be periodically repeated in order to keep the blowdown valve free of debris.

Additionally, due to the plurality of pressure-reducing passages disposed within the bore insert, the pressure and velocity of the fluid flowing through the blowdown valve is reduced. Advantageously, each one of the passages defines a tortuous flow path with each tortuous flow path defining a number of substantially right angle turns. The viscous friction that occurs within the fluid as well as skin friction that occurs between the fluid sliding along the tortuous flow path walls reduces the energy of the fluid, thereby limiting the velocity of the fluid flowing through the blowdown valve. The reduction in energy, or velocity, of the fluid effectively reduces the noise produced by the fluid as it exits the blowdown valve.

BRIEF DESCRIPTION OF THE DRAWINGS

These as well as other features of the present invention will become more apparent upon reference to the drawings wherein.

DETAILED DESCRIPTION OF THE INVENTION

Figure 1:
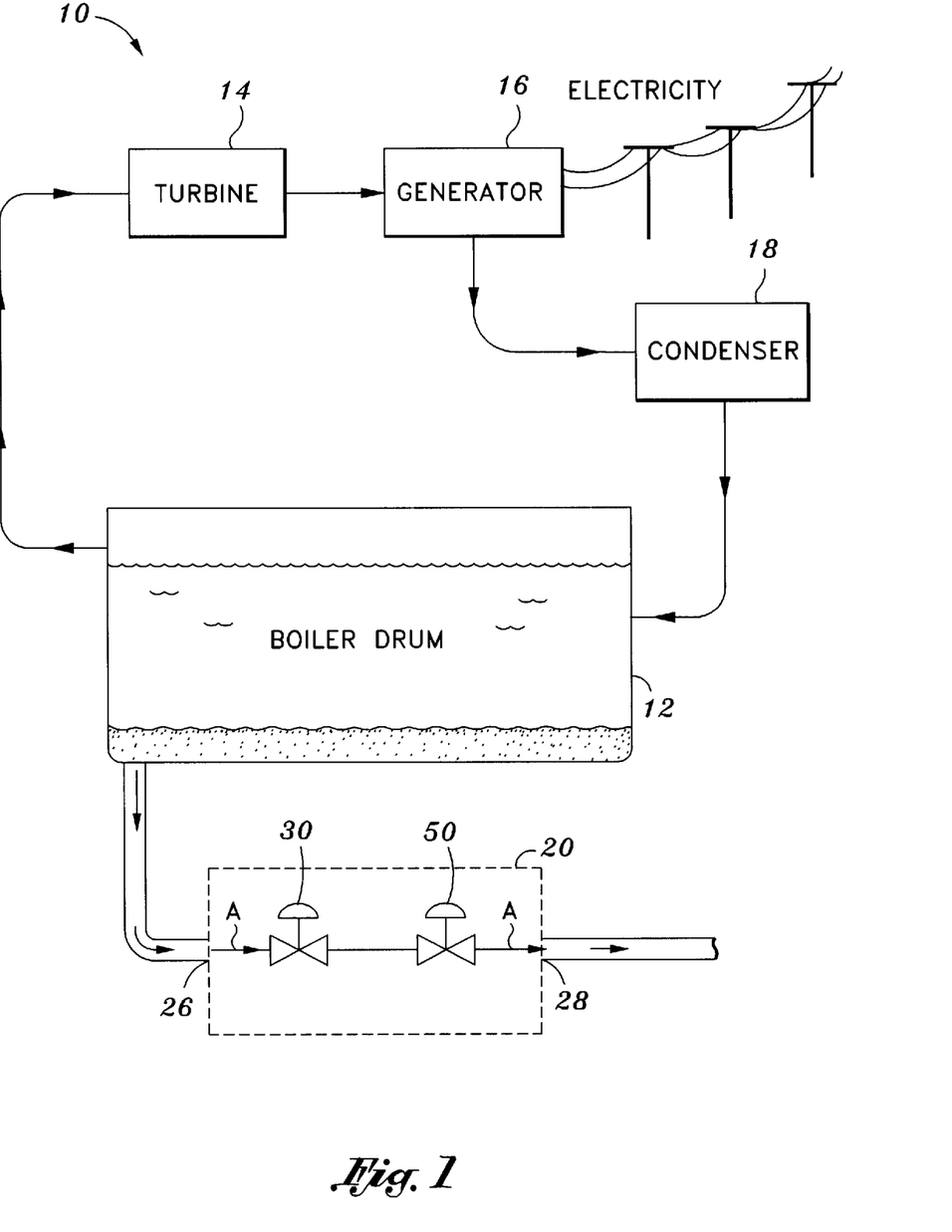
FIG. 1 is a schematic illustration of a boiler system incorporating a blowdown valve of the present invention.

Referring now to the drawings wherein the showings are for purposes of illustrating the present invention and not for purposes of limiting the same, FIG. 1 is a schematic illustration of a typical boiler system 10 incorporating a blowdown valve 20 of the present invention. Included in the boiler system 10 is the boiler drum 12, a turbine 14, a generator 16 and a condenser 18. Fluid, such as boiler water, is circulated through the boiler drum 12. Fuel such as natural gas, fuel oil or coal is utilized to heat the boiler water in the boiler drum 12 in order to produce steam. The steam is routed to the turbine 14 that rotates the generator 16 for producing electricity. The boiler water then passes through the condenser 18 before returning to the boiler drum 12. The boiler water may contain non-condensable, dissolved solids including dirt, sediment and piping scale. Such non-condensable, dissolved solids are hereinafter referred to as "debris". FIG. 1 illustrates a lower portion of the boiler drum 12 where higher concentrations of debris may exist in the boiler water.

Fluidly connected to the bottom of the boiler drum 12 is the blowdown valve 20. As can be seen in FIG. 1, the blowdown valve 20 is comprised of a shutoff valve 30 and a throttle valve 50. Fluid that carries debris flows from the boiler drum 12 into a fluid inlet 26 of the blowdown valve 20 along a direction indicated by the arrow A. When both the shutoff valve 30 and the throttle valve 50 are open, the fluid flows through the blowdown valve 20 before exiting a fluid outlet 28. Advantageously, the throttle valve 50 includes a first debris zone 70 and a second debris zone 72 configured for accumulating debris that is too large to pass through the throttle valve 50. As will be explained in more detail below, the throttle valve 50 is configured to be reversible such that when the accumulation of debris in one of the debris zones 70, 72 reaches a predetermined limit, the debris zone is rotated 180 degrees and repositioned adjacent the fluid outlet 28. Boiler water then flushes the accumulated debris out of the debris zone and through the fluid outlet 28.

Figure 2:
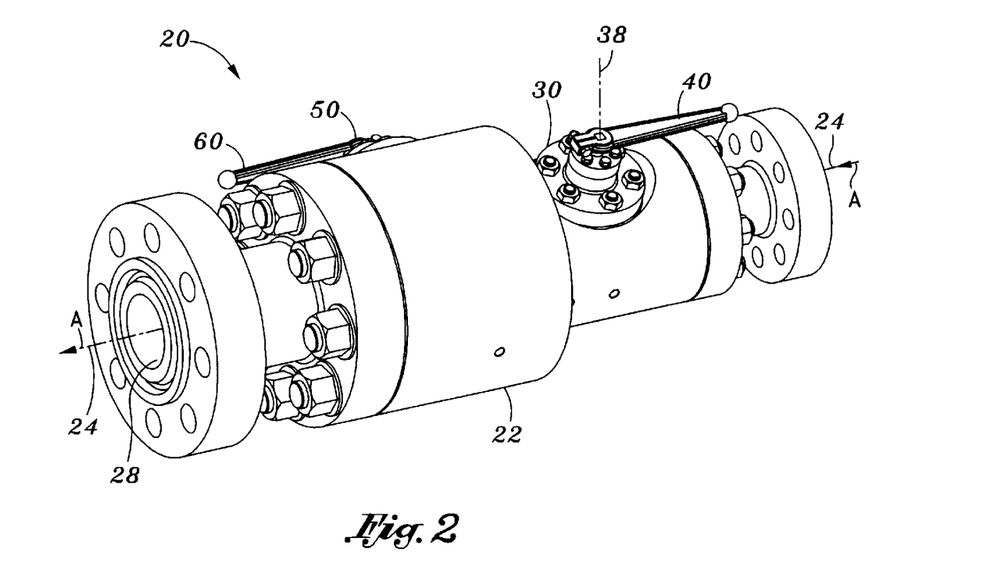
FIG. 2 is a perspective view of the blowdown valve illustrating a shutoff valve and a throttle valve disposed within a housing.

Turning now to FIG. 2, shown is perspective view of the blowdown valve 20 illustrating the shutoff valve 30 and the throttle valve 50 disposed within the housing 22 of the blowdown valve 20. As can be seen, the housing 22 defines a housing axis 24. The shutoff valve 30 and the throttle valve 50 are shown as being aligned with the housing axis 24, although other arrangements for axially orienting the shutoff and throttle valves 30, 50 may be utilized. Additionally, although the housing 22 in FIG. 2 is illustrated as a unitary structure, it is contemplated that the housing 22 may be comprised of two smaller housing portions (not shown) connected in series by a field joint to facilitate assembly and field maintenance of the shutoff valve 30 and the throttle valve 50. In this regard, the blowdown valve 20 may be comprised of two separate ball valves connected in series.

Figure 6:
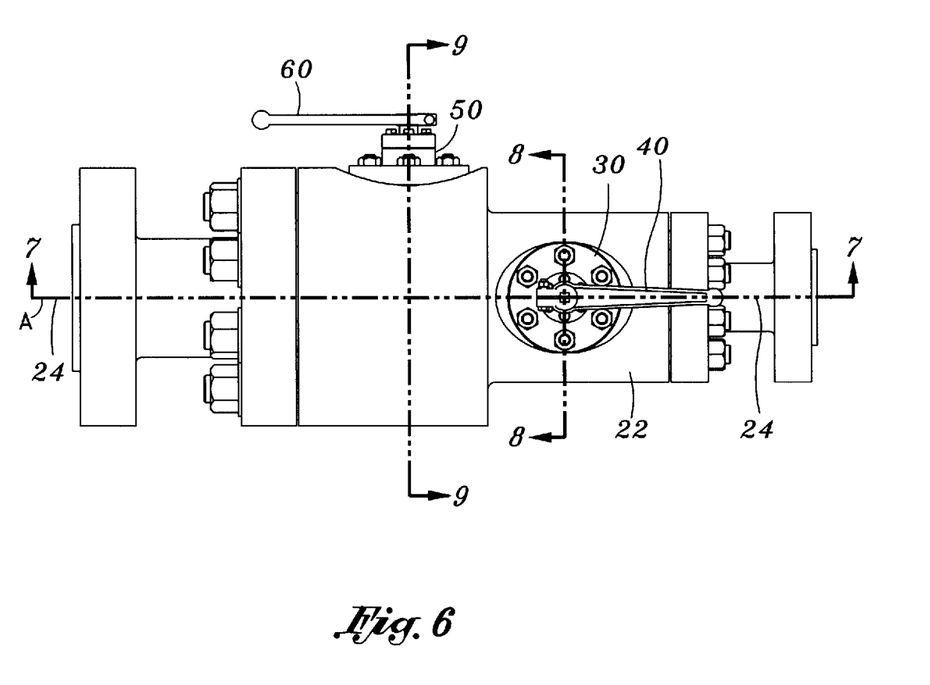
FIG. 6 is an elevational view of the blowdown valve illustrating the axial alignment and angular offset of the shutoff valve with the throttle valve.

Although the housing 22 illustrated in FIGS. 2 and 6 is depicted as including a field joint between the fluid outlet 28 and the throttle valve 50 as well as between the fluid inlet 26 and the shutoff valve 30, a unitary structure is provided in an area between the shutoff valve 30 and the throttle valve 50. However, it is contemplated that a field joint may be included in the housing 22 between the shutoff valve 30 and the throttle valve 50 in order to removably connect the shutoff valve 30 with the throttle valve 50. The field joint may include mechanical fasteners to aid in the assembly and disassembly of the blowdown valve 20 so as to enhance the installation, maintenance and transportability of the blowdown valve 20.

Figure 3:
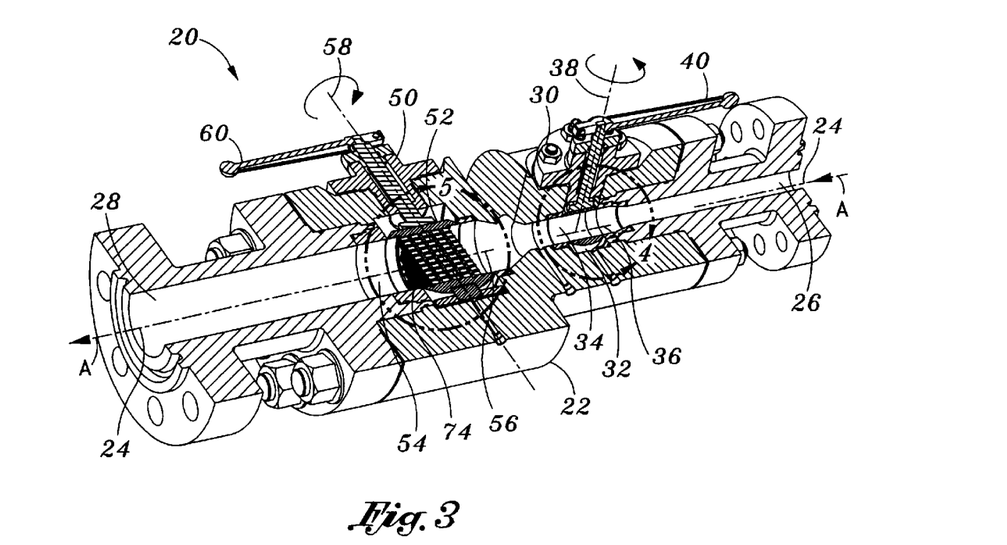
FIG. 3 is a partially cut-away perspective view of the blowdown valve illustrating the shutoff valve and the throttle valve disposed respectively adjacent a fluid inlet and fluid outlet of the housing.
Figure 4:
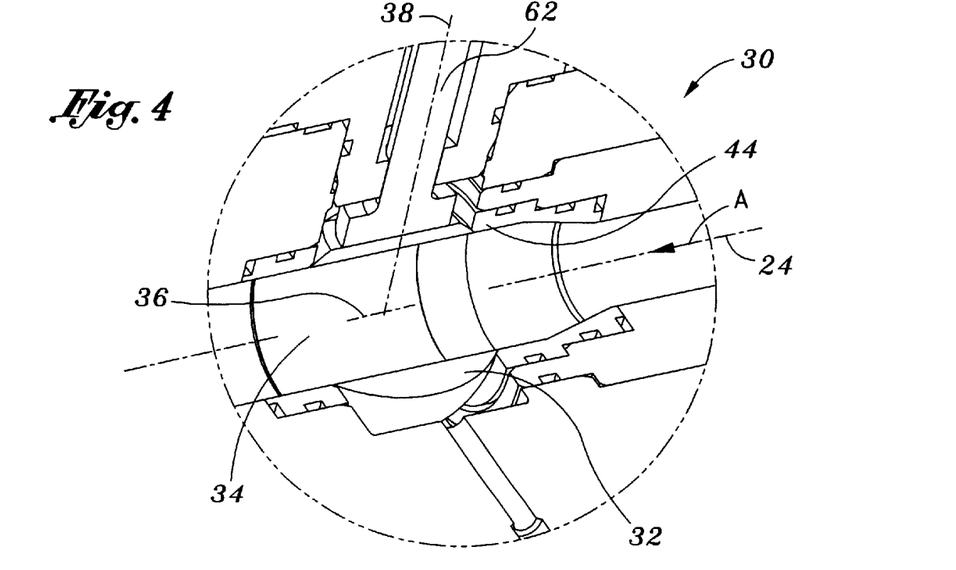
FIG. 4 is a partial cut-away perspective view taken along line 4 of FIG. 3 of the shutoff valve illustrating the arrangement of a valve ball disposed within the housing.
Figure 5:
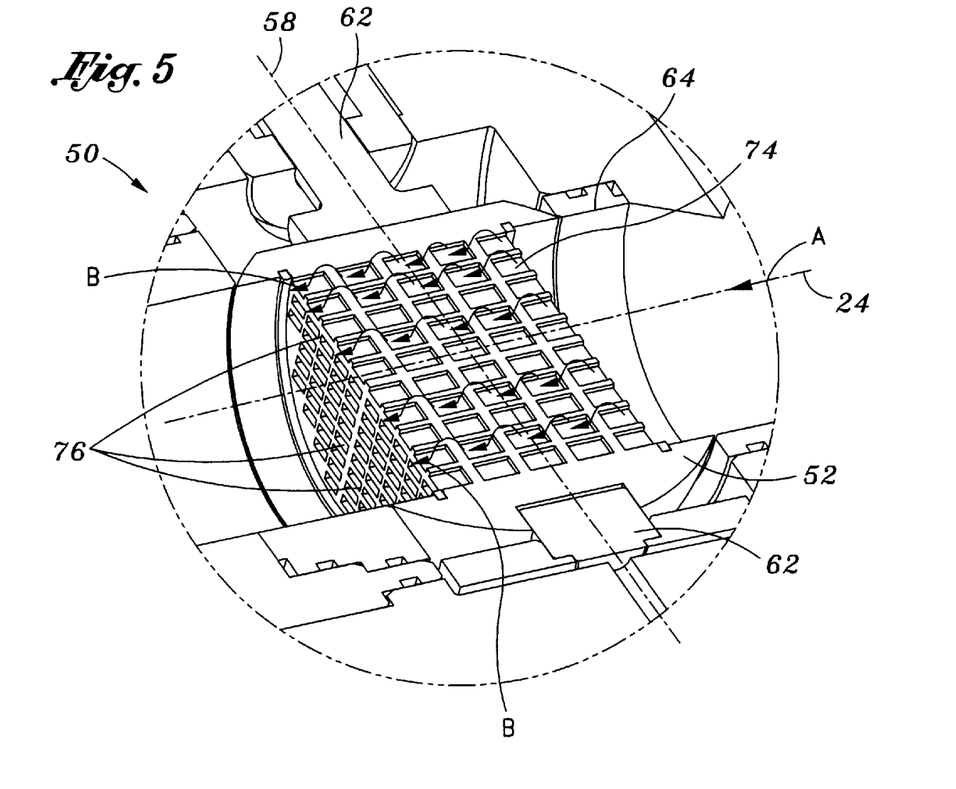
FIG. 5 is a partial cut-away perspective view taken along line 5 of FIG. 3 of the throttle valve illustrating the arrangement of a valve ball having a throttle valve bore with a bore insert disposed therein.

Turning to FIGS. 3, 4 and 5, shown is the blowdown valve 20 comprising the housing 22, the shutoff valve 30 and the throttle valve 50, each of which may be fabricated from alloy steel such as stainless steel, inconel, ceramic material or any other suitable material. The shutoff valve 30 and the throttle valve 50 are disposed adjacent respective ones of the fluid inlet 26 and the fluid outlet 28. The fluid inlet 26 and fluid outlet 28 are shown in FIGS. 3, 4 and 5 as being substantially in axial alignment with each other. As was mentioned above, the fluid inlet 26 of the housing 22 is fluidly connected to the boiler system 10 and is configured for receiving fluid therefrom. As can be seen in FIG. 3, the shutoff valve 30 is disposed within the housing 22 and is in fluid communication with the fluid inlet 26. The shutoff valve 30 includes a rotatable, generally spherically-shaped valve ball 32 having a shutoff valve bore 34 formed therethrough.

The shutoff valve bore 34 may pass through a center of the valve ball 32 although it may be offset from the valve ball 32 center. The shutoff valve bore 34 defines a bore axis 36. The valve ball 32 also defines a rotation axis 38 that is oriented normally relative to the bore axis 36. The valve ball 32 is configured such that rotation thereof about the rotation axis 38 through an angle of about 90 degrees alternately places the shutoff valve bore 34 into and out of alignment with the fluid inlet 26.

As shown in FIGS. 2 and 3, the shutoff valve 30 includes a valve handle 40 fixedly connected to the valve ball 32. The throttle valve 50 includes a valve handle 60 fixedly connected to the valve ball 52. The valve handles 40, 60 of respective ones of the throttle valve 50 and the shutoff valve 30 are configured to rotate respective ones of the valve balls 32, 52 during operation of the blowdown valve 20. By rotating the valve handle 40, the shutoff valve bore 34 is rotated substantially into alignment with the fluid inlet 26. The flow of fluid is then unblocked such that fluid may pass through the shutoff valve bore 34. When the shutoff valve bore 34 is rotated about 90 degrees out of alignment with the fluid inlet 26, the flow of fluid through the shutoff valve bore 34 is blocked. The rotation of the shutoff valve 30 may be effected manually as by a handwheel. Alternatively, the rotation of the shutoff valve 30 may be effected by any type of actuator (e.g., electric, pneumatic, hydraulic).

Also shown in FIG. 3 is the reversible throttle valve 50. As can be seen, the throttle valve 50 is fluidly connected to and interposed between the shutoff valve 30 and the fluid outlet 28. The throttle valve 50 comprises a rotatable, generally spherically-shaped valve ball 52 having a throttle valve bore 54 formed therethrough. The throttle valve bore 54 includes a first end 66 and a second end 68. A bore insert 74 is interposed within the throttle valve bore 54 between the first end 66 and the second end 68, shown in FIG. 7. The throttle valve bore 54 is axially alignable with the fluid outlet 28. The throttle valve bore 54 also defines a bore axis 56. The valve ball 52 defines a rotation axis 58 that is oriented normally relative to the bore axis 56.

Figures 7, 8, 9:
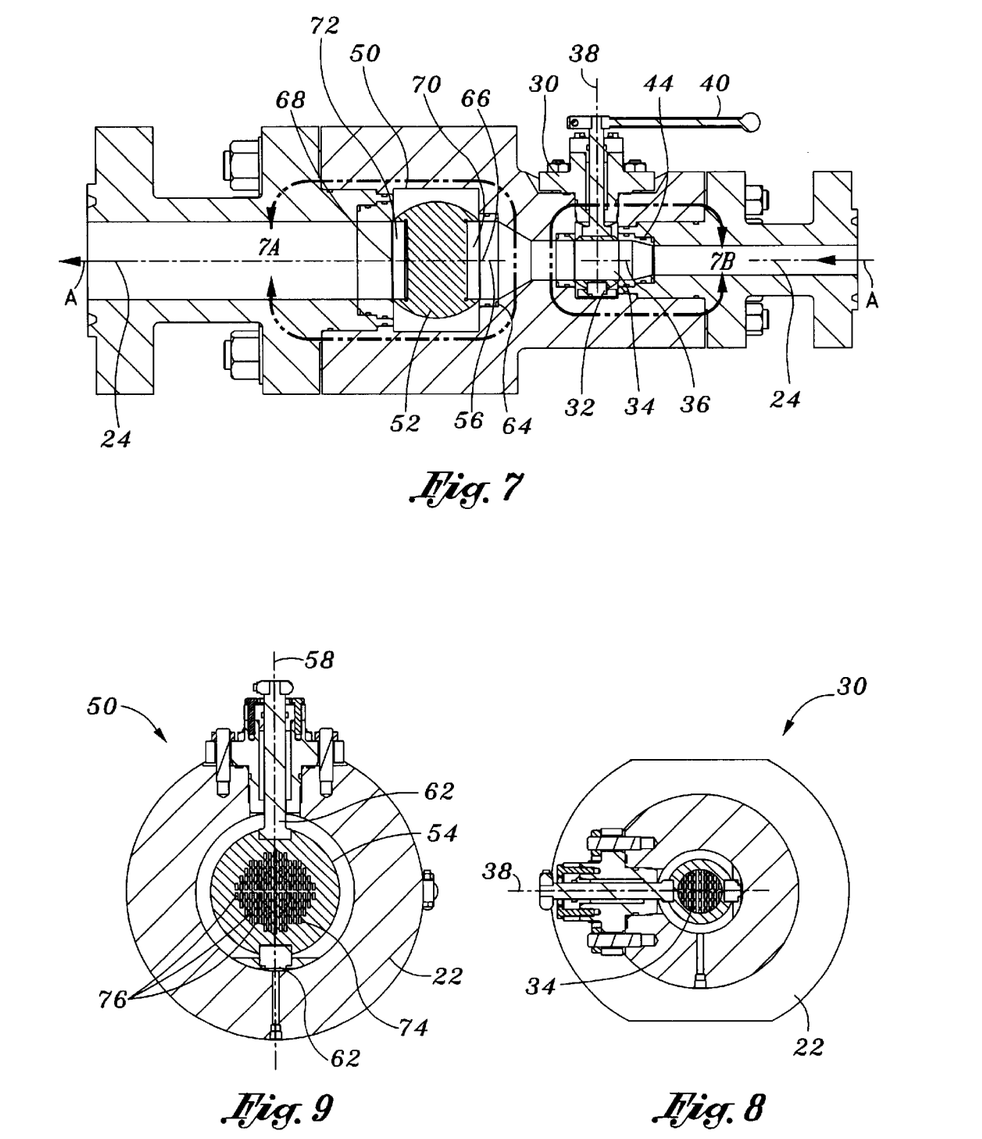
FIG. 7 is a cross-sectional view of the blowdown valve taken along line 7—7 of FIG. 6 illustrating the valve balls and valve seats of respective ones of the shutoff valve and the throttle valve.
FIG. 8 is a cross-sectional view of the shutoff valve taken along line 8—8 of FIG. 6 illustrating the orientation of the shutoff valve bore in a fully open position.
FIG. 9 is a cross-sectional view of the throttle valve taken along line 9—9 of FIG. 6 illustrating a bore insert disposed within a throttle valve bore oriented in a fully open position.
Figures 10, 11, 12:
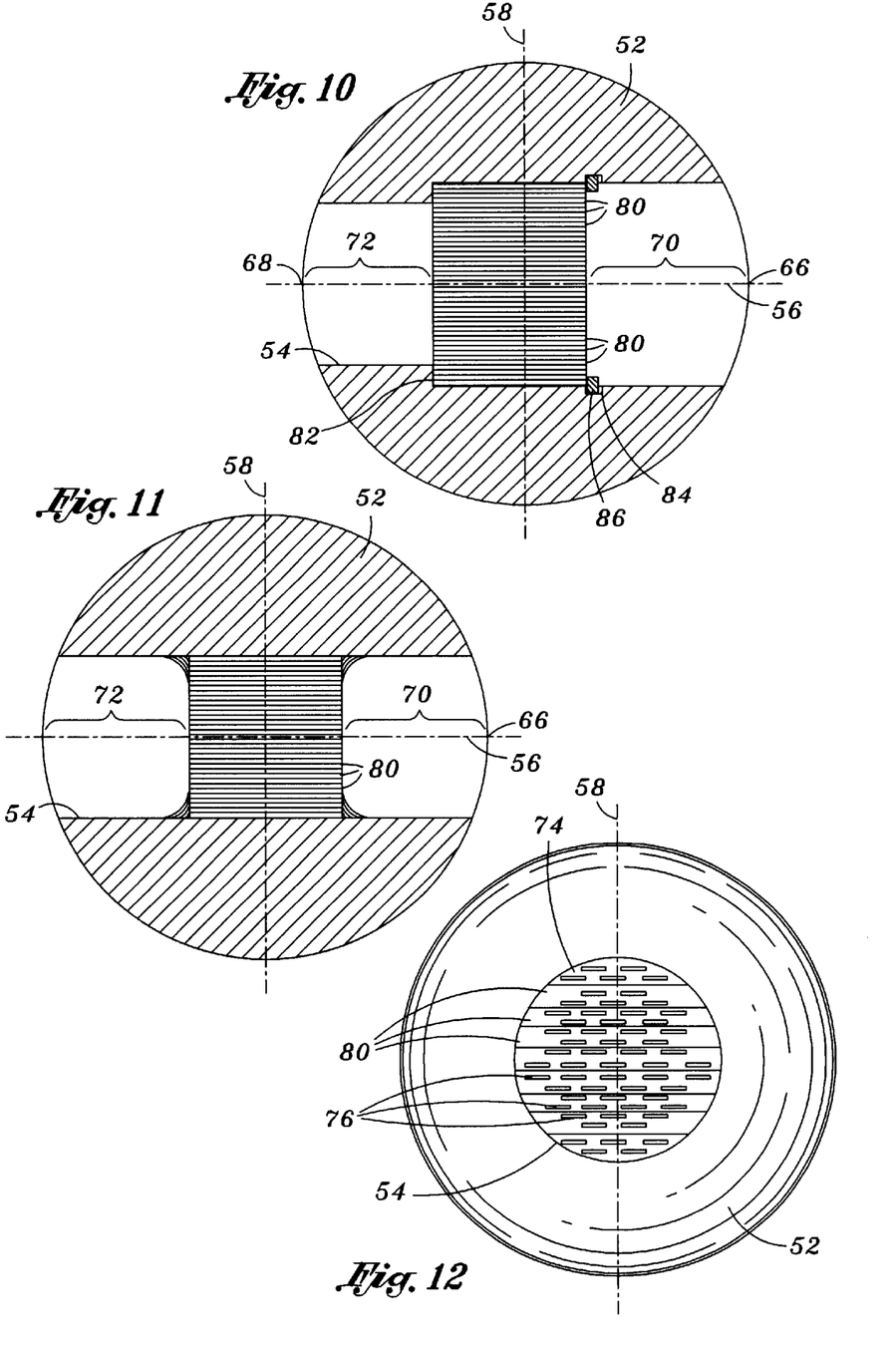
FIG. 10 is a cross-sectional view of the valve ball of the throttle valve illustrating a back step and a groove formed in the throttle valve bore with the bore insert being captured between the back step and a snap ring disposed within the groove.
FIG. 11 is a cross-sectional view of the valve ball of the throttle valve taken along line 9—9 of FIG. 6 illustrating the bore insert being welded within the throttle valve bore.
FIG. 12 is an elevational view of the valve ball of the throttle valve illustrating a stack of plates that may make up the bore insert.

The bore insert 74 is configured for reducing energy of fluid flowing therethrough. The energy of the fluid may be characterized by an elevated pressure and velocity of the fluid, as will be explained in more detail below. The bore insert 74 includes a plurality of passages 76 configured to reduce the pressure and velocity of the fluid so as to reduce the noise level that is emitted by the blowdown valve as the fluid exits the fluid outlet 28. The bore insert 74 and the first end 66 of the throttle valve bore 54 collectively define a first debris zone 70 therebetween, as is shown in FIGS. 7, 10 and 11.

Likewise, the bore insert 74 and the second end 68 of the throttle valve bore 54 collectively define a second debris zone 72 therebetween. The first debris zone 70 is disposed on one side of the bore insert 74 with the second debris zone 72 being disposed on an opposite side of the bore insert 74. The first debris zone 70 is configured to entrap debris therewithin when the first debris zone 70 is disposed between the bore insert 74 and the shutoff valve 30. As will be explained in greater detail below, debris that is too large to pass through the passages 76 of the bore insert 74 is deposited within the first debris zone 70. Over time, the amount of large-sized debris accumulates within the first debris zone 70. Advantageously, the valve ball 52 is configured such that rotation of the valve handle 60 about the rotation axis 58 through an angle of about 180 degrees reverses positions of the first and second debris zones 70, 72. When the accumulation of debris reaches a predetermined level, the positions of the first debris zone 70 and the second debris zone 72 are reversed such that that the first debris zone 70 is placed adjacent the fluid outlet 28.

By reversing positions of the first debris zone 70 and the second debris zone 72, entrapped debris may be flushed out of the fluid outlet 28 by fluid flowing through the blowdown valve 20 when the shutoff valve bore 34 is rotated into alignment with the fluid inlet 26. When the shutoff valve 30 is opened, the debris in the first debris zone 70 is flushed out of the fluid outlet 28 by fluid flowing through the throttle valve 50. The second debris zone 72 is now positioned to catch debris that is too large to pass through the passages 76 of the bore insert 74. When the accumulation of debris in the second debris zone 72 reaches a predetermined level, the valve ball 52 is again rotated about 180 degrees such that the second debris zone 72 is flushed clean of debris. The blowdown valve 20 of the present invention is configured such that the above-described blowdown operation may be periodically repeated in order to keep the blowdown valve 20 free of debris.

It should be noted that the throttle valve 50 may be utilized to modulate or meter the flow rate through the blowdown valve 20 in proportion to signals from an actuator. By varying the angular rotation of the valve ball 52 of the throttle valve 50 between a fully open and a fully closed position, the flow rate of fluid passing through the blowdown valve 20 may be regulated. As in the shutoff valve 30, the rotation of the throttle valve 50 may be effected manually as by a handwheel or by any type of actuator (e.g., electric, pneumatic, hydraulic). Furthermore, it is contemplated that the shutoff valve 30 and the throttle valve 50 may be actuated independently or by an interlink mechanism wherein a controller or actuator coordinates the actuation of the throttle valve 50 and shutoff valve 30.

As can be seen in FIGS. 3 and 5, the fluid outlet 28 and the throttle valve bore 54 each define an inner cylindrical surface having substantially equal inner diameters. Although, the fluid inlet 26 and the shutoff valve bore 34 are shown in FIG. 4 as being configured with inner cylindrical surfaces having unequal inner diameters, it is contemplated that the fluid inlet 26 and the shutoff valve bore 34 may also be configured with substantially equal inner diameters. In either case, the blowdown valve 20 of the present invention is configured such that the inner diameters of the fluid outlet 28 and shutoff valve 30 are greater than the inner diameters of the fluid inlet 26 and the shutoff valve 30. In this manner, the fluid flow cross-sectional area through the blowdown valve 20 generally increases along the flow direction A. Advantageously, the increasing cross-sectional area of the fluid flow restricts the speed thereof through the throttle valve 50 despite the expansion of the flowing fluid. It is contemplated that the inner diameters of respective ones of the fluid inlet 26 and the shutoff valve 30 may be about two inches with the inner diameters of respective ones of the fluid outlet 28 and throttle valve 50 being about four inches.

Turning now to FIGS. 6, 7, 8 and 9, shown are elevational and sectional views of the blowdown valve 20. In FIG. 6, the blowdown valve 20 is shown as being configured such that the shutoff valve 30 rotation axis 38 is radially offset about 90 degrees relative to the throttle valve 50 rotation axis 58. The 90-degree radial offset may prevent interference when the valve handles 40, 60 of the respective shutoff and throttle valves 30, 50 are rotated. However, it is contemplated that any degree of radial offset between the shutoff valve 30 and the throttle valve 50 may be utilized.

Turning now to FIG. 7, shown is a cross-sectional view of the blowdown valve 20 illustrating the valve balls 32, 52 and valve seats 44, 64 of the shutoff valve 30 and the throttle valve 50. As can be seen in FIG. 7, the valve ball 52 of the throttle valve 50 is rotatably supported by a pair of oppositely disposed trunnions 62 extending outwardly from the valve ball 52 along the rotation axis 58 thereof. The pair of trunnions 62 extending from the valve ball 52 of the throttle valve 50 are journaled into the housing 22. Likewise, the shutoff valve 30 includes a pair of oppositely disposed trunnions 62 extending outwardly from the valve ball 32 of the shutoff valve 30 along the rotation axis 38.

Figure 7A:
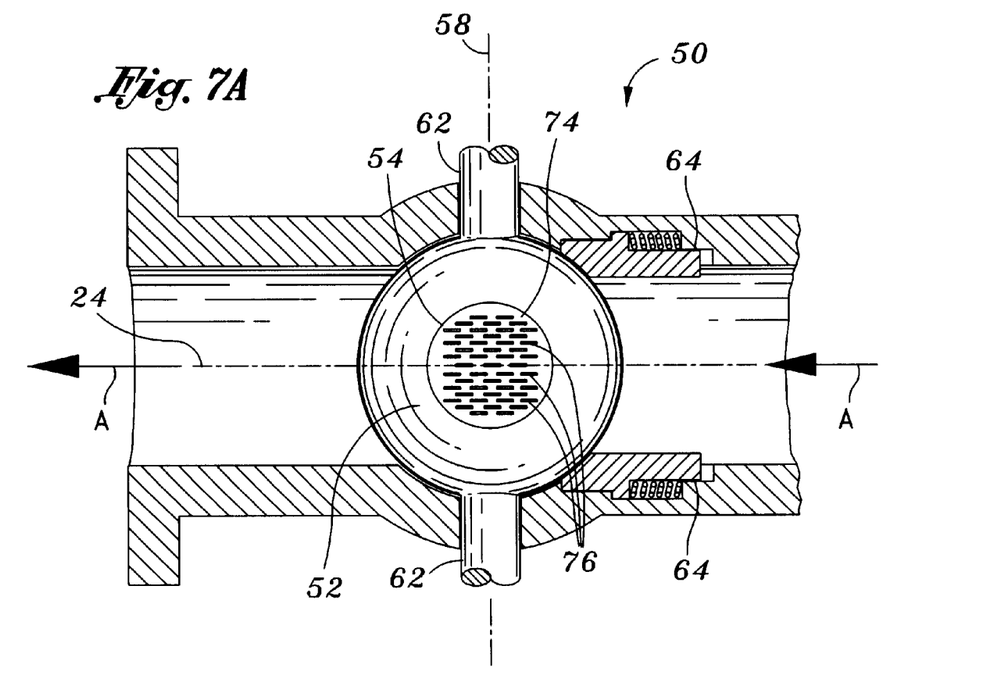
FIG. 7A is a cross-sectional view of the throttle valve taken along line 7A of FIG. 7 illustrating the valve seat thereof disposed downstream of and in sealing engagement with the valve ball.

In configurations wherein the valve ball 52 of the throttle valve 50 is supported by the pair of trunnions 62, the housing 22 may include an axially-movable circular valve seat 64 disposed in sealing engagement against the valve ball 52 on a side thereof opposite the fluid outlet 28, or upstream of the throttle valve 50, as shown in FIGS. 5 and 7A. At low flow rates, the axially-movable valve seat 64 relies on springs disposed between the valve seat 64 and the housing 22 in order to maintain sealing contact between the valve seat 64 and the valve ball 52. However, at higher flow rates, sealing pressure is provided by flowing fluid which axially forces the valve seat 64 against the valve ball 52 in order to maintain a leak-proof seal therebetween. As fluid pressure and fluid velocity increases, a proportionally higher force is applied by the flowing fluid against the axially-movable valve seat 64 which in turn seals against the valve ball 52 with increased pressure.

A similar arrangement may be provided for the shutoff valve 30 wherein the valve ball 32 thereof is supported by the pair of trunnions 62, partially shown in FIG. 4. The housing 22 may include the axially-movable circular valve seat 64 disposed in sealing engagement against the valve ball 32 on a side thereof adjacent the fluid inlet 26. At high fluid pressures, the valve seat 44 is forced against the valve ball 32. The trunnions 62 are axially immobile and are primarily configured to handle the bearing load induced by the flowing fluid as it bears against the valve ball 32. Consequently, for configurations wherein the valve balls 32, 52 are supported by trunnions 62, a relatively low operating torque is required in order to rotate the shutoff valve bore 34 and the throttle valve bore 54 into and out of alignment with the housing axis 24.

Figure 7B:
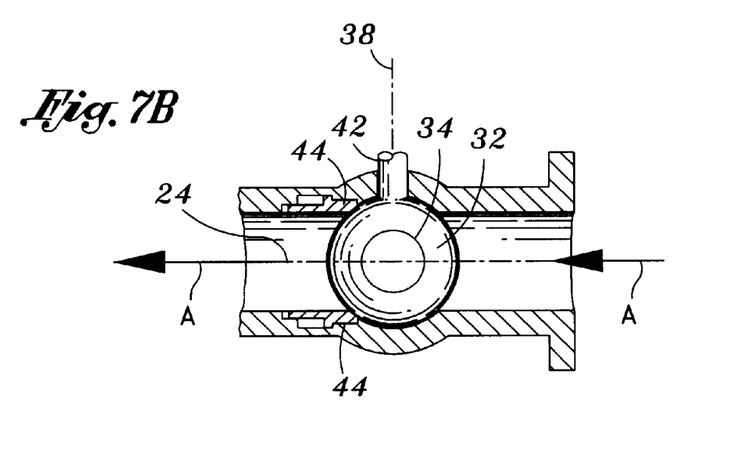
FIG. 7B is a cross-sectional view of the shutoff valve taken along line 7B of FIG. 7 illustrating the valve seat thereof disposed upstream of and in sealing engagement with the valve ball.

The shutoff valve 30 may alternately be rotatably supported by a floating mount comprising a single shaft 42 extending outwardly from the valve ball 32 along the rotation axis 38, as is shown in FIG. 7B. Similarly, the throttle valve 50 maybe supported by the single shaft 42. In FIG. 7B, the shaft 42 of the shutoff valve 30 is journaled into the housing 22 to rotatably support the valve ball 32 of the shutoff valve 30. An axially-fixed circular valve seat 44 is shown in FIG. 7B as being disposed in sealing engagement against the valve ball 32 on a side thereof opposite the fluid inlet 28 between the shutoff valve 30 and the throttle valve 50.

For such floating mounts of the valve balls 32, 52, the flowing fluid bears against the valve ball 32, 52 which in turn bears against the valve seat 44, 64 located immediately downstream of the valve balls 32, 52. In such configurations, the valve ball 32, 52 is held in place by a preload provided by the valve seat 44, 64 alone. However, for valve balls 32, 52 of relatively high mass, the floating mount may result in high stress on the valve seat 44, 64. Thus, for valve balls 32, 52 of relatively high mass, it may be preferable to utilize the pair of trunnions 62 for support in conjunction with the axially-movable configuration of the valve seat 44, 64. It is contemplated that the blowdown valve 20 of the present invention may be configured wherein the valve balls 32, 52 of respective ones of the shutoff valve 30 and throttle valve 50 may be supported by either the pair of trunnions 62 or by the single shaft 42. Regarding the material from which the valve seat 44, 64 may be fabricated, it is contemplated that alloy steel such as stainless steel may be utilized. However, the valve seat 44, 64 may optionally be fabricated from ceramic material or from any other suitable material.

Referring now to FIG. 8, shown is a sectional view of the shutoff valve 30 with the shutoff valve bore 34 thereof being oriented such that it is in axial alignment with the housing axis 24. In FIG. 9, shown is a sectional view of the throttle valve 50 with the throttle valve bore 54 thereof being oriented such that it is in axial alignment with the housing axis 24. The bore insert 74 may be sized and configured complimentary to the throttle valve bore 54. In this regard, the bore insert 74 may have a generally cylindrical shape to match a cylindrically-shaped throttle valve bore 54 as is shown in FIG. 12. The bore insert 74 also is of a width such that the first and second debris zones 70, 72 are formed within the throttle valve bore 54.

The bore insert 74 may be affixed to the throttle valve bore 54 by welding as can be seen in FIG. 11. Alternatively, the bore insert 74 may be removably disposed within the bore 54. Toward this end, the throttle valve bore 54 defines an inner cylindrical surface having a back step 82 and a groove 84, as is shown in FIG. 10. The back step 82 and groove 84 are each formed circumferentially around the inner cylindrical surface of the throttle valve bore 54 and are disposed in axially spaced relation to each other. The throttle valve 50 may include a snap ring 86, as can be seen in FIG. 10.

The groove 84 is configured for receiving the snap ring 86. The bore insert 74 is sized and configured complimentary to the inner cylindrical surface and is captured between the back step 82 and the snap ring 86. Regardless of the manner in which the bore insert is affixed within the throttle valve bore 54, it is recognized herein that there are any number of configurations that are suitable for affixing the bore insert 74 within the throttle valve bore 54.

As was mentioned above, the bore insert 74 is configured for reducing the energy of fluid flowing therethrough. Due to the plurality of pressure-reducing passages 76 disposed within the bore insert 74, the pressure and velocity of the fluid flowing therethrough is reduced. Advantageously, each of the passages 76 defines the tortuous flow path B indicated by the arrows in FIG. 5. As was also earlier mentioned, each one of the tortuous flow paths B includes a number of substantially right angle turns.

The viscous friction that occurs within the fluid as well as skin friction that occurs between the fluid sliding along the tortuous flow path B walls reduces the energy of the fluid. The tortuous flow paths B are configured to reduce the energy of the fluid by limiting the fluid velocity. The reduction in energy of the fluid effectively reduces the noise produced by the fluid as it exits the blowdown valve 20. As can be seen in FIG. 12, the bore insert 74 may be formed of a stack of plates 80 disposed in abutting contact. Each one of the plates 80 may be scalloped such that the plurality of passages 76 are formed therein as is shown in FIG. 12. The passages 76 are formed between adjacent ones of the plates 80, as is shown in FIG. 5. Though not shown, it will be recognized that the passages 76 may be formed in any of a large variety of configurations, depending upon the desired pressure reduction characteristics for the bore insert 74. However, it is preferred that any such configuration of the passages 76 be "reversible" such that flow through the bore insert 74 is not compromised upon the reversal of the positions of the first and second debris zones 70, 72.

The operation of the blowdown valve 20 will now be described. Initially, the shutoff valve 30 is placed in a closed position wherein the shutoff valve bore 34 is rotated out of alignment with the fluid inlet 26 of the housing 22 by rotation of the valve handle 40. The throttle valve 50 is then placed into an open position wherein the throttle valve bore 54 is rotated into alignment with the housing axis 24 by rotation of the valve handle 60. The shutoff valve 30 is then placed into an open position wherein the shutoff valve bore 34 is rotated into alignment with the fluid inlet 26 of the housing 22 by rotation of the valve handle 40. In the open position of the throttle valve 50, either the first debris zone 70 or the second debris zone 72 will be oriented such that the flowing fluid will pass therethrough prior to entering the bore insert 74. For purposes of this discussion regarding the operation of the blowdown valve 20, it will be initially assumed that the first debris zone 70 is disposed upstream of the bore insert 74 and the second debris zone 72 is disposed downstream of the bore insert 74.

The shutoff valve 30 is placed into an open position by an approximate 90-degree rotation of the valve handle 40 such that the shutoff valve bore 34 is rotated into alignment with the fluid inlet 26 of the housing 22. Fluid may then flow from the boiler drum 12 toward the fluid inlet 26 in the flow direction A, passing through the shutoff valve bore 34, and moving toward the throttle valve 50. As was mentioned earlier, the flowing fluid carries debris. Debris that is smaller than the passages 76 of the bore insert 74 will pass through the bore insert 74 and exit the fluid outlet 28 along with the fluid. However, debris that is larger than the passages 76 of the bore insert 74 is deposited in the first debris zone 70 of the valve ball 52. Over time, the debris will accumulate within the first debris zone 70.

When the accumulation of debris reaches a predetermined level, the shutoff valve 30 is rotated back into the closed position by rotating the valve handle 40 to move the shutoff valve bore 34 out of alignment with the fluid inlet 26 in order to prevent fluid from entering the blowdown valve 20. The throttle valve 50 is then reversed by a 180-degree rotation of the valve handle 60 such that the first debris zone 70 is moved to a position downstream of the bore insert 74 adjacent the fluid outlet 28. When the shutoff valve 30 is then re-opened, fluid again flows from the boiler drum 12 toward the fluid inlet 26 in the flow direction A, passing through the shutoff valve 30, and moving toward the throttle valve 50.

Debris that is entrapped within the first debris zone 70 is then flushed out of the fluid outlet 28. The second debris zone 72 is now positioned upstream of the bore insert 74 and catches debris that is too large to pass through the passages 76 of the bore insert 74. When the accumulation of debris reaches a predetermined level, the valve ball 52 is again rotated 180 degrees such that the second debris zone 72 is flushed clean of debris. The above-described blowdown operation may be periodically repeated in order to keep the blowdown valve 20 free of debris. The blowdown valve 20 of the present invention may include an actuator (not shown) configured to automatically and periodically rotate the valve ball 32, 52 of respective ones of the shutoff valve 30 and throttle valve 50.

Advantageously, the pressure-reducing passages 76 of the bore insert 74 are configured to reduce the pressure and velocity of the fluid flowing therethrough. As was mentioned earlier, each one of the passages 76 defines the tortuous flow path B having a number of substantially right angle turns. Energy losses occur in the fluid due to viscous friction within the fluid itself and due to skin friction between the fluid and the tortuous flow path B. The viscous frictional losses combined with the skin frictional losses limits the fluid velocity, effectively reducing the high noise levels that would otherwise be emitted by the blowdown valve as the fluid exits the fluid outlet 28. As was mentioned above, the throttle valve 50 may be utilized to regulate the flow rate of fluid passing through the blowdown valve 20 by varying the angular rotation of the valve ball 52. By modulating the angular orientation of the valve ball 52 such that the bore axis 56 is axially offset in varying degrees from the housing axis 24, the flow rate of fluid through the blowdown valve 20 may be metered.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A blowdown valve for a boiler system for removing fluid that contains debris, the blowdown valve comprising:
    a housing having a fluid outlet and a fluid inlet in fluid communication with the boiler system;
    a shutoff valve disposed within the housing and in fluid communication with the fluid inlet, the shutoff valve including a rotatable valve ball having a shutoff valve bore formed therethrough, the valve ball being configured such that rotation of the valve ball alternately places the shutoff valve bore into and out of alignment with the fluid inlet for selectively unblocking and blocking fluid flowing from the boiler system; and
    a reversible throttle valve disposed within the housing and in fluid communication with the shutoff valve and the fluid outlet, the throttle valve comprising:
        a rotatable valve ball having a throttle valve bore formed therethrough defining first and second bore ends; and
        a bore insert interposed within the throttle valve bore between the first and second bore ends and configured for reducing energy of fluid flowing therethrough, the bore insert and the first and second bore ends collectively and respectively defining first and second debris zones configured to alternately entrap debris therewithin when the second and first debris zones are respectively disposed adjacent the fluid outlet;
    wherein the valve ball is configured to reverse positions of the first and second debris zones such that debris entrapped therein may be flushed out of the fluid outlet by fluid flowing therethrough.

2. The blowdown device of claim 1 wherein:
    the fluid inlet and the shutoff valve bore each define an inner cylindrical surface having substantially equal inner diameters;
    the fluid outlet and the throttle valve bore each define an inner cylindrical surface having substantially equal inner diameters;
    wherein the inner diameters of the fluid outlet and the throttle valve bore are greater than the inner diameters of the fluid inlet and the shutoff valve bore.

3. The blowdown device of claim 2 wherein:
    the inner diameters of the fluid inlet and the shutoff valve bore are each about two inches; and
    the inner diameters of the fluid outlet and throttle valve bore are each about four inches.

4. The blowdown device of claim 1 wherein the housing includes a field joint interposed between and configured to removably connect the shutoff valve with the throttle valve.

5. The blowdown device of claim 1 wherein:
    the throttle valve bore defines a bore axis;
    the valve ball of the throttle valve defines a rotation axis oriented normally relative to the bore axis; and
    the valve ball of the throttle valve is rotatably supported by a pair of oppositely disposed trunnions extending outwardly from the valve ball along the rotation axis, the pair of trunnions being journaled into the housing.

6. The blowdown valve of claim 5 wherein the housing includes an axially-movable circular valve seat disposed in sealing engagement against the valve ball on a side thereof opposite the fluid outlet.

7. The blowdown device of claim 1 wherein:
    the shutoff valve bore defines a bore axis;
    the valve ball of the shutoff valve defines a rotation axis oriented normally relative to the bore axis; and
    the valve ball of the shutoff valve is rotatably supported by a shaft extending outwardly from the valve ball along the rotation axis, the shaft being journaled into the housing.

8. The blowdown valve of claim 7 wherein the housing includes an axially-fixed circular valve seat disposed in sealing engagement against the valve ball on a side opposite the fluid inlet.

9. The blowdown valve of claim 1 wherein:
    the throttle valve includes a snap ring; and
    the throttle valve bore defines an inner cylindrical surface having a back step and a groove, the back step and groove being formed circumferentially around the inner cylindrical surface and disposed in axially spaced relation to each other, the groove being configured for receiving the snap ring;
    wherein the bore insert is sized and configured complimentary to the inner cylindrical surface and is captured between the back step and the snap ring.

10. The blowdown valve of claim 1 wherein the bore insert includes a plurality of passages formed therethrough, each one of the passages defining a tortuous path of substantially right angle turns configured to limit fluid velocity.

11. The blowdown valve of claim 10 wherein the bore insert is formed of a stack of plates, each one of the plates being scalloped and disposed in abutting contact such that the plurality of passages are formed between adjacent ones of the plates.

12. The blowdown valve of claim 1 wherein the housing, the shutoff valve and the throttle valve are fabricated from alloy steel.

13. The blowdown valve of claim 12 wherein the housing, the shutoff valve and the throttle valve are fabricated from stainless steel.

14. The blowdown valve of claim 12 wherein the housing, the shutoff valve and the throttle valve are fabricated from ceramic material.

15. A blowdown valve for a boiler system for removing fluid that contains debris, the blowdown valve comprising:
    a housing having a fluid inlet and a fluid outlet in axial alignment therewith, the fluid inlet being fluidly connected to the boiler system;
    a shutoff valve disposed within the housing and in fluid communication with the fluid inlet, the shutoff valve comprising:
        a rotatable valve ball having a shutoff valve bore formed therethrough and defining a bore axis, the valve ball defining a rotation axis oriented normally relative to the bore axis; and a valve handle fixedly connected to the valve ball;

wherein rotation of the valve handle about the rotation axis through an angle of about ninety degrees alternately places the shutoff valve bore into and out of alignment with the fluid inlet for selectively unblocking and blocking fluid flowing from the boiler system; and a reversible throttle valve disposed within the housing and in fluid communication with and interposed between the shutoff valve and the fluid outlet, the throttle valve comprising:

a rotatable valve ball having a throttle valve bore formed therethrough, the throttle valve bore being axially alignable with the fluid outlet and defining a bore axis and having first and second bore ends, the valve ball defining a rotation axis oriented normally relative to the bore axis;

a valve handle fixedly connected to the valve ball; and a bore insert interposed within the throttle valve bore between the first and second bore ends and configured for reducing energy of fluid flowing therethrough, the bore insert and the first bore end collectively defining a first debris zone therebetween, the bore insert and the second bore end collectively defining a second debris zone therebetween, the first and second debris zones being configured to alternately entrap debris therewithin when the throttle valve bore is oriented such that the second and first debris zones are respectively disposed adjacent the fluid outlet;

wherein rotation of the valve handle about the rotation axis through an angle of about one-hundred-eighty degrees reverses positions of the first and second debris zones such that entrapped debris may be flushed out of the fluid outlet by fluid flowing through the blowdown valve when the shutoff valve bore is rotated into alignment with the fluid inlet.

16. The blowdown device of claim 15 wherein the bore insert is welded to the throttle valve bore.

17. The blowdown valve of claim 15 wherein:

the throttle valve includes a snap ring; and the throttle valve bore defines an inner cylindrical surface having a back step and a groove, the back step and groove being formed circumferentially around the cylindrical surface and disposed in axially spaced relation to each other, the groove being configured for receiving the snap ring;

wherein the bore insert is sized and configured complimentary to the inner cylindrical surface and is captured between the back step and the snap ring.

18. The blowdown valve of claim 15 wherein the bore insert includes a plurality of passages formed therethrough, each one of the passages defining a tortuous path of substantially right angle turns configured to limit fluid velocity.

19. The blowdown valve of claim 18 wherein the bore insert is formed of a stack of plates, each one of the plates being scalloped and disposed in abutting contact such that the plurality of passages are formed between adjacent ones of the plates.

* * * * *